United States Patent
Won (10) Patent No.: US 12,143,921 B2
(45) Date of Patent: Nov. 12, 2024

(54) STEERING OF TERMINALS IN CASE OF DISASTER

(71) Applicant: NOKIA TECHNOLOGIES OY, Espoo (FI)

(72) Inventor: Sung Hwan Won, Flower Mound, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 439 days.

(21) Appl. No.: 17/577,799

(22) Filed: Jan. 18, 2022

(65) Prior Publication Data

US 2022/0232457 A1 Jul. 21, 2022

Related U.S. Application Data

(60) Provisional application No. 63/138,644, filed on Jan. 18, 2021.

(51) Int. Cl.
*H04W 48/10* (2009.01)
*H04W 48/02* (2009.01)

(52) U.S. Cl.
CPC ........... *H04W 48/10* (2013.01); *H04W 48/02* (2013.01)

(58) Field of Classification Search
CPC .............................. H04W 48/18; H04W 92/12
USPC .................................. 455/424, 418; 370/252
See application file for complete search history.

(56) References Cited

U.S. PATENT DOCUMENTS

| | | | |
|---|---|---|---|
| 2019/0159108 A1* | 5/2019 | Lee .................. | H04W 48/10 |
| 2021/0168697 A1* | 6/2021 | Wallentin ............. | H04W 48/02 |
| 2022/0248304 A1* | 8/2022 | Guttman ................ | H04L 69/40 |

FOREIGN PATENT DOCUMENTS

WO 2021/007447 A1 1/2021

OTHER PUBLICATIONS

3GPP TS 22.261 V18.1.0 (Dec. 2020), Technical Specification, 3rd Generation Partnership Project; Technical Specification Group Services and System Aspects; Service Requirements for the 5G system; Stage 1 (Release 18), Dec. 2020.
3GPP TR 24.811 V0.1.0 (Dec. 2020), Technical Report, 3rd Generation Partnership Project; Technical Specification Group Core Network and Terminals; Study on the support for minimization of service interruption; (Release 17), Dec. 2020.
Ericsson, "MINT: solution for How are UEs/subscribers notified that a "Disaster Condition" applies?" C1-207323, 3GPP TSG-CT WG1 Meeting #126-e, Electronic Meeting, Oct. 15-23, 2020.

(Continued)

*Primary Examiner* — Kiet M Doan
(74) *Attorney, Agent, or Firm* — Robert P. Michal, Esq.; Carter, DeLuca & Farrell LLP (57) ABSTRACT

Systems, methods, apparatuses, and computer program products for steering terminals to a different network in case of a disaster. A method may include sending, to a network node of a first network, a first message including an indication that a disaster condition applies to a second network when the disaster condition applies to the second network. The method may also include sending a second message to the network node of the first network including an indication that the disaster condition no longer applies to the second network when the disaster condition no longer applies to the second network.

1 Claim, 5 Drawing Sheets

(56) References Cited

OTHER PUBLICATIONS

Ericsson, "MINT: alternative 1 for How are other PLMNs (= not subject to the disaster) notified that a "Disaster Condition" applies / no longer applies?" C1-207324, 3GPP TSG-CT WG1 Meeting #126-e, Electronic Meeting, Oct. 15-23, 2020.

Ericsson, "MINT: alternative 2 for How are other PLMNs (= not subject to the disaster) notified that a "Disaster Condition" applies / no longer applies?" C1-207325, 3GPP TSG-CT WG1 Meeting #126-e, Electronic Meeting, Oct. 15-23, 2020.

Ericsson, "MINT: alternative 1 for How do other PLMNs indicate that they can accept "Disaster Inbound Roamers"?" C1-207326, 3GPP TSG-CT WG1 Meeting #126-e, Electronic Meeting, Oct. 15-23, 2020.

Ericsson, "MINT: alternative 2 for How do other PLMNs indicate that they can accept "Disaster Inbound Roamers"?" C1-207327, 3GPP TSG-CT WG1 Meeting #126-e, Electronic Meeting, Oct. 15-23, 2020.

Ericsson, "MINT: solution for How can UE/subscribers perform network selection for disaster roaming?" C1-207328, 3GPP TSG-CT WG1 Meeting #126-e, Electronic Meeting, Oct. 15-23, 2020.

Ericsson, "MINT: solution for How are UE/subscribers notified that the "Disaster Condition" no longer applies?" C1-207329, 3GPP TSG-CT WG1 Meeting #126-e, Electronic Meeting, Oct. 15-23, 2020.

Ericsson, "MINT: solution for How to ensure one PLMN failure does not lead to signalling overload in other PLMNs?" C1-207330, 3GPP TSG-CT WG1 Meeting #126-e, Electronic meeting, Oct. 15-23, 2020.

Ericsson, "MINT: solution for How to avoid "returning UEs" overloading the PLMN that had earlier failed?" C1-207331, 3GPP TSG-CT WG1 Meeting #126-e, Electronic meeting; Oct. 15-23, 2020.

Ericsson, MINT: alternative 1 for Registration to the roaming PLMN (= not subject to the disaster) in case of the "disaster condition," C1-207332, 3GPP TSG-CT WG1 Meeting #126-e, Electronic Meeting, Oct. 15-23, 2020.

Ericsson, MINT: alternative 2 for Registration to the roaming PLMN (= not subject to the disaster) in case of the "disaster condition," C1-207333, 3GPP TSG-CT WG1 Meeting #126-e, Electronic Meeting, Oct. 15-23, 2020.

SA1, "Ls on MINT requirements," S1-204329, 3GPP TSG-SA WG1 Meeting #92e, Electronic Meeting, Nov. 10-19, 2020.

Extended European Search Report issued in corresponding European Patent Application No. 22151117.3-1216 on Jun. 20, 2022.

NTT DoCoMo, KDDI, Orange, NEC, Qualcomm, 3GPP TSG RAN WG2 #62, Tdoc-R2-082861, Kansas City, USA May 5-9, 2008, 8 pages.

Nokia, Nokia Shanghai Bell, 3GPP TSG-CT WG1 Meeting #127bis-3, C1-210329, Electronic meeting; Jan. 25-29, 2021, 3 pages.

QUALCOMM Incorporated, 3GPP TSG-CT WG1 Meeting #127-e, C1-207685, Electronic Meeting; Nov. 13-20, 2020, 2 pages.

\* cited by examiner

STEERING OF TERMINALS IN CASE OF DISASTER

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for steering terminals to a different network in case of a disaster.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments may be directed to a method. The method may include sending, to a network node of a first network, a first message including an indication that a disaster condition applies to a second network when the disaster condition applies to the second network. The method may also include sending a second message to the network node of the first network including an indication that the disaster condition no longer applies to the second network when the disaster condition no longer applies to the second network.

Other example embodiments may be directed to an apparatus. The apparatus may include at least one processor and at least one memory including computer program code. The at least one memory and computer program code may also be configured to, with the at least one processor, cause the apparatus at least to send, to a network node of a first network, a first message including an indication that a disaster condition applies to a second network when the disaster condition applies to the second network. The apparatus may also be caused to send a second message to the network node of the first network including an indication that the disaster condition no longer applies to the second network when the disaster condition no longer applies to the second network.

Other example embodiments may be directed to an apparatus. The apparatus may include means for sending, to a network node of a first network, a first message including an indication that a disaster condition applies to a second network when the disaster condition applies to the second network. the apparatus may also include means for sending a second message to the network node of the first network including an indication that the disaster condition no longer applies to the second network when the disaster condition no longer applies to the second network.

In accordance with other example embodiments, a non-transitory computer readable medium may be encoded with instructions that may, when executed in hardware, perform a method. The method may include sending, to a network node of a first network, a first message including an indication that a disaster condition applies to a second network when the disaster condition applies to the second network. The method may also include sending a second message to the network node of the first network including an indication that the disaster condition no longer applies to the second network when the disaster condition no longer applies to the second network.

Other example embodiments may be directed to a computer program product that performs a method. The method may include sending, to a network node of a first network, a first message including an indication that a disaster condition applies to a second network when the disaster condition applies to the second network. The method may also include sending a second message to the network node of the first network including an indication that the disaster condition no longer applies to the second network when the disaster condition no longer applies to the second network.

Other example embodiments may be directed to an apparatus that may include circuitry configured to send, to a network node of a first network, a first message comprising an indication that a disaster condition applies to a second network when the disaster condition applies to the second network. The apparatus may also include circuitry configured to send a second message to the network node of the first network comprising an indication that the disaster condition no longer applies to the second network when the disaster condition no longer applies to the second network.

Some example embodiments may be directed to a method. The method may include receiving a first message including an indication that a disaster condition applies to a second network. The method may also include broadcasting information about the second network upon receiving the first message. The method may further include receiving a second message including an indication that the disaster condition no longer applies to the second network. Further, the method may include ceasing broadcast of the information about the second network upon receiving the second message.

Other example embodiments may be directed to an apparatus. The apparatus may include at least one processor and at least one memory including computer program code. The at least one memory and computer program code may also be configured to, with the at least one processor, cause the apparatus at least to receive a first message including an indication that a disaster condition applies to a second network. The apparatus may also be configured to broadcast information about the second network upon receiving the first message. The apparatus may further be configured to receive a second message including an indication that the disaster condition no longer applies to the second network. Further, the apparatus may be configured to cease broadcast of the information about the second network upon receiving the second message.

Other example embodiments may be directed to an apparatus. The apparatus may include means for receiving a first message including an indication that a disaster condition applies to a second network. The apparatus may also include means for broadcasting information about the second network upon receiving the first message. The apparatus may further include means for receiving a second message comprising an indication that the disaster condition no longer applies to the second network. Further, the apparatus may include means for ceasing broadcast of the information about the second network upon receiving the second message.

In accordance with other example embodiments, a non-transitory computer readable medium may be encoded with instructions that may, when executed in hardware, perform a method. The method may include receiving a first message including an indication that a disaster condition applies to a second network. The method may also include broadcasting information about the second network upon receiving the first message. The method may further include receiving a second message including an indication that the disaster condition no longer applies to the second network. Further, the method may include ceasing broadcast of the information about the second network upon receiving the second message.

Other example embodiments may be directed to a computer program product that performs a method. The method may include receiving a first message including an indication that a disaster condition applies to a second network. The method may also include broadcasting information about the second network upon receiving the first message. The method may further include receiving a second message including an indication that the disaster condition no longer applies to the second network. Further, the method may include ceasing broadcast of the information about the second network upon receiving the second message.

Other example embodiments may be directed to an apparatus that may include circuitry configured to receive a first message including an indication that a disaster condition applies to a second network. The apparatus may also include circuitry configured to broadcast information about the second network upon receiving the first message. The apparatus may further include circuitry configured to receive a second message including an indication that the disaster condition no longer applies to the second network. Further, the apparatus may include circuitry configured to cease broadcast of the information about the second network upon receiving the second message.

Some example embodiments may be directed to a method. The method may include receiving broadcast information containing a barring factor for an access identity. The method may also include performing an access barring check for an access attempt associated with the access identity using the broadcast information. In certain example embodiments, within the access barring check, whether the access attempt associated with the access identity is considered as allowed or barred is determined by comparing the barring factor for the access identity and a number drawn randomly.

Other example embodiments may be directed to an apparatus. The apparatus may include at least one processor and at least one memory including computer program code. The at least one memory and computer program code may also be configured to, with the at least one processor, cause the apparatus at least to receive broadcast information containing a barring factor for an access identity. The apparatus may also be caused to perform an access barring check for an access attempt associated with the access identity using the broadcast information. In certain example embodiments, within the access barring check, whether the access attempt associated with the access identity is considered as allowed or barred is determined by comparing the barring factor for the access identity and a number drawn randomly.

Other example embodiments may be directed to an apparatus. The apparatus may include means for receiving broadcast information containing a barring factor for an access identity. The apparatus may also include means for performing an access barring check for an access attempt associated with the access identity using the broadcast information. In certain example embodiments, within the access barring check, whether the access attempt associated with the access identity is considered as allowed or barred is determined by comparing the barring factor for the access identity and a number drawn randomly.

In accordance with other example embodiments, a non-transitory computer readable medium may be encoded with instructions that may, when executed in hardware, perform a method. The method may include receiving broadcast information containing a barring factor for an access identity. The method may also include performing an access barring check for an access attempt associated with the access identity using the broadcast information. In certain example embodiments, within the access barring check, whether the access attempt associated with the access identity is considered as allowed or barred is determined by comparing the barring factor for the access identity and a number drawn randomly.

Other example embodiments may be directed to a computer program product that performs a method. The method may include receiving broadcast information containing a barring factor for an access identity. The method may also include performing an access barring check for an access attempt associated with the access identity using the broadcast information. In certain example embodiments, within the access barring check, whether the access attempt associated with the access identity is considered as allowed or barred is determined by comparing the barring factor for the access identity and a number drawn randomly.

Other example embodiments may be directed to an apparatus that may include circuitry configured to receive broadcast information containing a barring factor for an access identity. The apparatus may also include circuitry configured to perform an access barring check for an access attempt associated with the access identity using the broadcast information. In certain example embodiments, within the access barring check, whether the access attempt associated with the access identity is considered as allowed or barred is determined by comparing the barring factor for the access identity and a number drawn randomly.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for steering terminals to a different network in case of a disaster.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

3$^{rd}$ Generation Partnership Project (3GPP) has studied support for minimization of service interruption based on certain requirements specified in 3GPP TS 22.261. The result of the study is described in 3GPP TR 24.811, which describes certain issues including, for example: notification of disaster condition to a user equipment (UE), notification of applicability on disaster condition to public land mobile networks (PLMNs) without disaster condition, indication of accessibility from other PLMNs without disaster condition to the UE, registration to the roaming PLMN without disaster condition in case of disaster condition, PLMN selection when a disaster condition applies, notification that disaster condition is no longer applicable to the UEs, prevention of signaling overload in PLMNs without disaster condition, and prevention of signaling overload by returning UEs in PLMN previously with disaster condition. The disaster condition may be a condition that a government decides to initiate and terminate when, for example, a natural disaster occurs or has occurred. In certain cases, when a disaster condition applies, users of the UE may have an opportunity to mitigate service interruptions and failures. Though the above issues are described in TR 24.811, there is currently no consideration that the core network (CN) functions are still operational.

In view of the issues described above, certain example embodiments may provide a next generation radio access network (NG-RAN) node that is configured to indicate to an access and mobility management function (AMF) whether a supported tracking area identity (TAI) is for a disaster condition. According to certain example embodiments, the NG-RAN may provide this indication via an NG SETUP REQUEST message and/or a RAN CONFIGURATION UPDATE message. In certain example embodiments, the TAI may be used to identify tracking areas (TAs). A TA may correspond to an area of 5G radio coverage that is comprised of a collection of 5G cells. If a 5G mobile device is in an idle state, its current TA may be known to the AMF. In addition, the TAI may be constructed from a mobile country code (MCC), mobile network code (MNC), and tracking area code (TAC).

In certain example embodiments, the AMF may indicate whether it is under the disaster condition. According to certain example embodiments, the AMF may provide this indication via an NG SETUP RESPONSE message or an AMF CONFIGURATION UPDATE message. In some example embodiments, if the AMF supporting one or more PLMNs indicates that it is under the disaster condition, the NG-RAN node may broadcast information about the PLMNs, if supported. For example, in certain example embodiments (e.g., a TAI that is for disaster condition and includes the identity of one of the PLMNs). In other example embodiments, if the AMF supporting one or more PLMNs indicates that it is not under the disaster condition, the NG-RAN node may stop or does not broadcast information about the PLMNs.

According to certain example embodiments, in a disaster condition of a first PLMN1, a UE that normally uses PLMN1 may be able to use a second PLMN2. In other words, the UE may be able to use the RAN nodes of PLMN2, assuming that PLMN2 is not in a disaster condition. In certain example embodiments, it may be assumed that the RAN components/parts are affected by the disaster condition, and the CN part of PLMN1 is still operating normally.

In certain example embodiments RAN nodes of PLMN2 may signal to the AMF of PLMN1 that they support taking over UEs of PLMN1 in case of a disaster condition in PLMN1. In case of a disaster condition in PLMN1, the AMF of PLMN1 may signal the disaster condition to RAN nodes of PLMN2. In response to receiving the signal from the AMF of PLMN1, RAN nodes of PLMN2 may start broadcasting that UEs normally connecting to PLMN1 are also allowed to connect to RAN nodes of PLMN2. Thus, UEs of PLMN1 may connect to the CN of PLMN1 via RAN nodes of PLMN2. After the disaster condition in PLMN1 is over, normal operation may resume.

Figure 1:
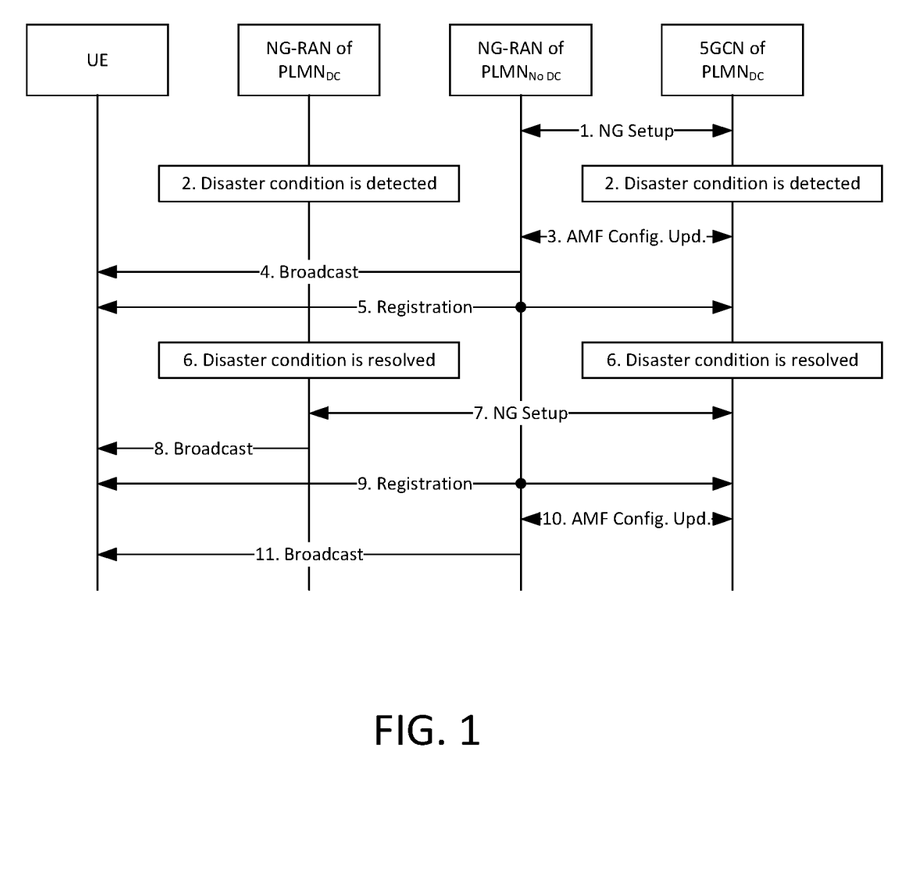
FIG. 1 illustrates an example of a call flow diagram, according to certain example embodiments.

FIG. 1 illustrates an example of a call flow diagram, according to certain example embodiments. As illustrated in the example of FIG. 1, $PLMN_{DC}$ may represent a PLMN where, at some point, a disaster condition occurs. On the other hand, $PLMN_{No\ DC}$ may represent a PLMN that stays operational and "takes over" UEs originally using $PLMN_{DC}$. In the example of FIG. 1, at 1, if two PLMNs have a service level agreement (SLA) that one PLMN (e.g., $PLMN_{No\ DC}$) supports disaster inbound roamers of the other PLMN (e.g., $PLMN_{DC}$) in an area, the NG-RAN nodes of $PLMN_{No\ DC}$ covering the area may initiate an NG setup procedure towards the AMF of $PLMN_{DC}$.

According to certain example embodiments, when the NG-RAN of $PLMN_{No\ DC}$ sends the NG SETUP REQUEST message to AMF of $PLMN_{DC}$, the NG-RAN of $PLMN_{No\ DC}$ may include in the message, one or more TAIs containing the identity of $PLMN_{DC}$, wherein the identity identifies the entire PLMN including NG-RAN and 5GCN. For each of the TAIs containing the identity of the $PLMN_{DC}$, the NG-RAN of $PLMN_{No\ DC}$ may indicate that the TAI is supported if a disaster condition applies for $PLMN_{DC}$. The AMF shall consider that a TAI which includes the identity of $PLMN_{DC}$ and is associated with an indication that the TAI is supported if a disaster condition applies for $PLMN_{DC}$ is supported by the NG-RAN of $PLMN_{No\ DC}$ only if a disaster condition applies for $PLMN_{DC}$.

In certain example embodiments, the AMF of $PLMN_{DC}$ may respond with the NG SETUP RESPONSE message indicating that a disaster condition does not apply for $PLMN_{DC}$. If the AMF of $PLMN_{DC}$ indicates that a disaster condition applies for $PLMN_{DC}$, the NG-RAN of $PLMN_{No\ DC}$ does not broadcast any information about $PLMN_{DC}$.

As further illustrated in the example of FIG. 1, at 2, a disaster condition may be detected by the 5GCN in the $PLMN_{DC}$. At this point, the UE may perform PLMN selection after losing coverage of $PLMN_{DC}$. At 3, the AMF of $PLMN_{DC}$ may notify that a disaster condition applies for $PLMN_{DC}$. For example, the AMF of $PLMN_{DC}$ can send the AMF CONFIGURATION UPDATE message including an indication that the AMF is under disaster condition associated with the identity of $PLMN_{DC}$ to the NG-RAN of $PLMN_{No\ DC}$. Further, the NG-RAN of $PLMN_{No\ DC}$ may respond with an AMF CONFIGURATION UPDATE ACKNOWLEDGE message. At 4, the NG-RAN of $PLMN_{No\ DC}$ may start broadcasting information about $PLMN_{DC}$ to the UE. For instance, in certain example embodiments, the one or more TAIs containing the identity of $PLMN_{DC}$ may be broadcast. In certain example embodiments, in order to prevent legacy UEs or UEs not supporting the feature (i e "minimization of service interruption") that used to be served by $PLMN_{DC}$ from accessing the NG-RAN of $PLMN_{No\ DC}$, the broadcast information related to $PLMN_{DC}$ may be included in a different container than the one used to convey broadcast information, which can be interpreted by legacy UEs or UE as not supporting the feature. In addition, the barring information for $PLMN_{DC}$, may be broadcast to the UE to prevent signaling overload caused by UEs (e.g., disaster inbound roamers). According to certain example embodiments, the barring information may include information about Access Identity 3 (e.g., an access identity configured in a UE for which a disaster condition applies). In order to adjust the rate of access attempts made by UEs configured with Access Identity 3, the barring information may include a barring factor for Access Identity 3. Thus, when a UE configured with Access Identity 3 makes an access attempt, if the radio resource control (RRC) layer of the UE is indicated Access Identity 3, the RRC layer of the UE that received the barring factor for Access identity 3 (via broadcast) checks whether the access attempt should be considered barred or allowed by drawing a random number, and comparing the random number and the barring factor for Access identity 3. In certain example embodiments, the UE may draw a random number between 0 and 1. Assuming for purposes of illustration, for example, that the issue draws 0.348234, if the barring factor for Access Identity 3 indicates 0.7, since 0.348234<0.7, the access attempt is considered not barred, i.e. allowed. In some example embodiments, the barring factor may be set lower at the first time, and it may be increased as needed.

As further illustrated in the example of FIG. 1, at 5, the disaster inbound roamers may register to $PLMN_{DC}$ via the NG-RAN of $PLMN_{No\ DC}$ (which may be a shared NG-RAN from the UE perspective), and the 5GCN of $PLMN_{DC}$. At 6, the disaster condition may be resolved (i.e., the disaster condition has ended, and NG-RAN of $PLMN_{DC}$ is fixed), and therefore no longer applicable. At 7, the N2 connection between the NG-RAN of $PLMN_{DC}$ and the AMF of $PLMN_{DC}$ may be retrieved. In certain example embodiments, the retrieval maybe initiated by the NG-RAN of $PLMN_{DC}$ by sending the NG SETUP REQUEST message. At 8, the NG-RAN of $PLMN_{DC}$ may start broadcasting. In certain example embodiments the barring parameters may be broadcasted to prevent signaling overload caused by the returning UEs. At 9, the UEs may register to $PLMN_{DC}$ via the NG-RAN of $PLMN_{DC}$ and the 5GCN of $PLMN_{DC}$.

The example of FIG. 1 further illustrates that, at 10, the AMF of $PLMN_{DC}$ may send the AMF CONFIGURATION UPDATE message to the NG-RAN of $PLMN_{No\ DC}$ to notify that a disaster condition is no longer applicable to $PLMN_{DC}$. The NG-RAN of $PLMN_{No\ DC}$ may respond with the AMF CONFIGURATION UPDATE ACKNOWLEDGE message. At 11, the NG-RAN of $PLMN_{No\ DC}$ may stop broadcasting any information about $PLMN_{DC}$.

Figure 2:
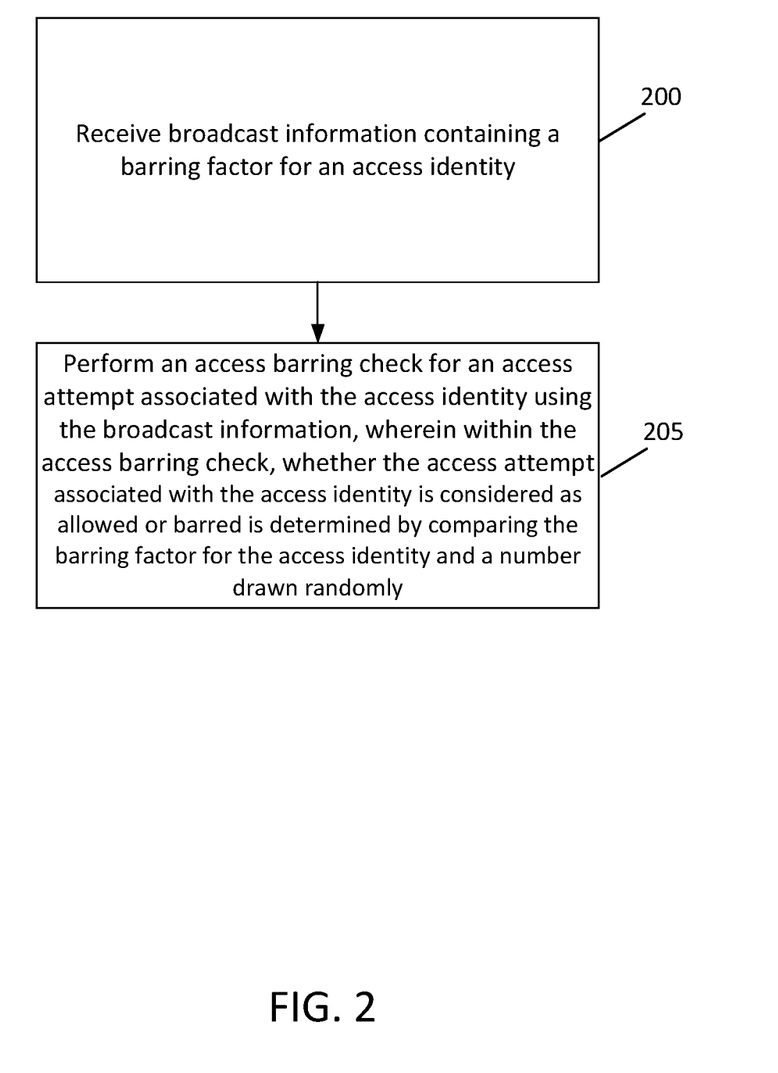
FIG. 2 illustrates an example flow diagram of a method, according to certain example embodiments.

FIG. 2 illustrates an example flow diagram of a method, according to certain example embodiments. In certain example embodiments, the flow diagram of FIG. 2 may be performed by a network entity or network node in a 3GPP system, such as LTE or 5G-NR. For instance, in an example embodiment, the method of FIG. 2 may be performed by a UE, for instance similar to apparatuses 10 or 20 illustrated in FIGS. 5(a) and 5(b).

According to certain example embodiments, the method of FIG. 2 may include, at 200, receiving broadcast information containing a barring factor for an access identity. The method may also include, at 205, performing an access barring check for an access attempt associated with the access identity using the broadcast information. According to certain example embodiments, within the access barring check, whether the access attempt associated with the access identity is considered as allowed or barred may be determined by comparing the barring factor for the access identity and a number drawn randomly.

According to certain example embodiments, the broadcast information may include one or more tracking area identifiers containing an identity of a network to which a disaster condition applies.

Figure 3:
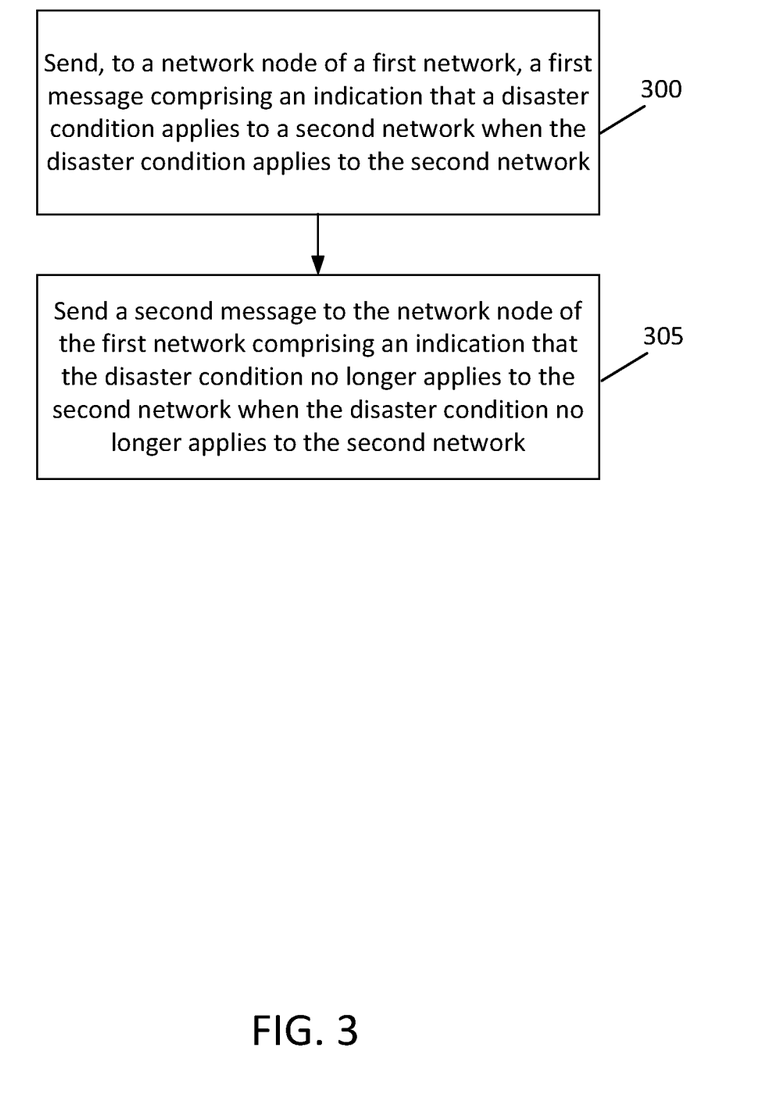
FIG. 3 illustrates an example flow diagram of another method, according to certain example embodiments.

FIG. 3 illustrates an example flow diagram of another method, according to certain example embodiments. In an example embodiment, the method of FIG. 3 may be performed by a network entity, network node, or a group of multiple network elements in a 3GPP system, such as LTE or 5G-NR. For instance, in an example embodiment, the method of FIG. 3 may be performed by a NG-RAN, 5GCN, AMF, or communication network, for instance similar to apparatus 20 illustrated in FIGS. 5(a) and 5(b).

According to certain example embodiments, the method of FIG. 3 may include, at 300, sending, to a network node of a first network, a first message including an indication that a disaster condition applies to a second network when the disaster condition applies to the second net. The method may also include, at 305, sending a second message to the network node of the first network including an indication that the disaster condition no longer applies to the second network when the disaster condition no longer applies to the second network.

According to certain example embodiments, the method may also include assisting user equipment under the disaster condition to register to the second network to which the disaster condition applies. According to other example embodiments, the method may further include receiving a message from the network node that includes one or more tracking area identities containing the second network to which the disaster condition applies. In certain example embodiments, the method may also include establishing an N2 connection to a network element of the second network to which the disaster condition applies.

Figure 4:
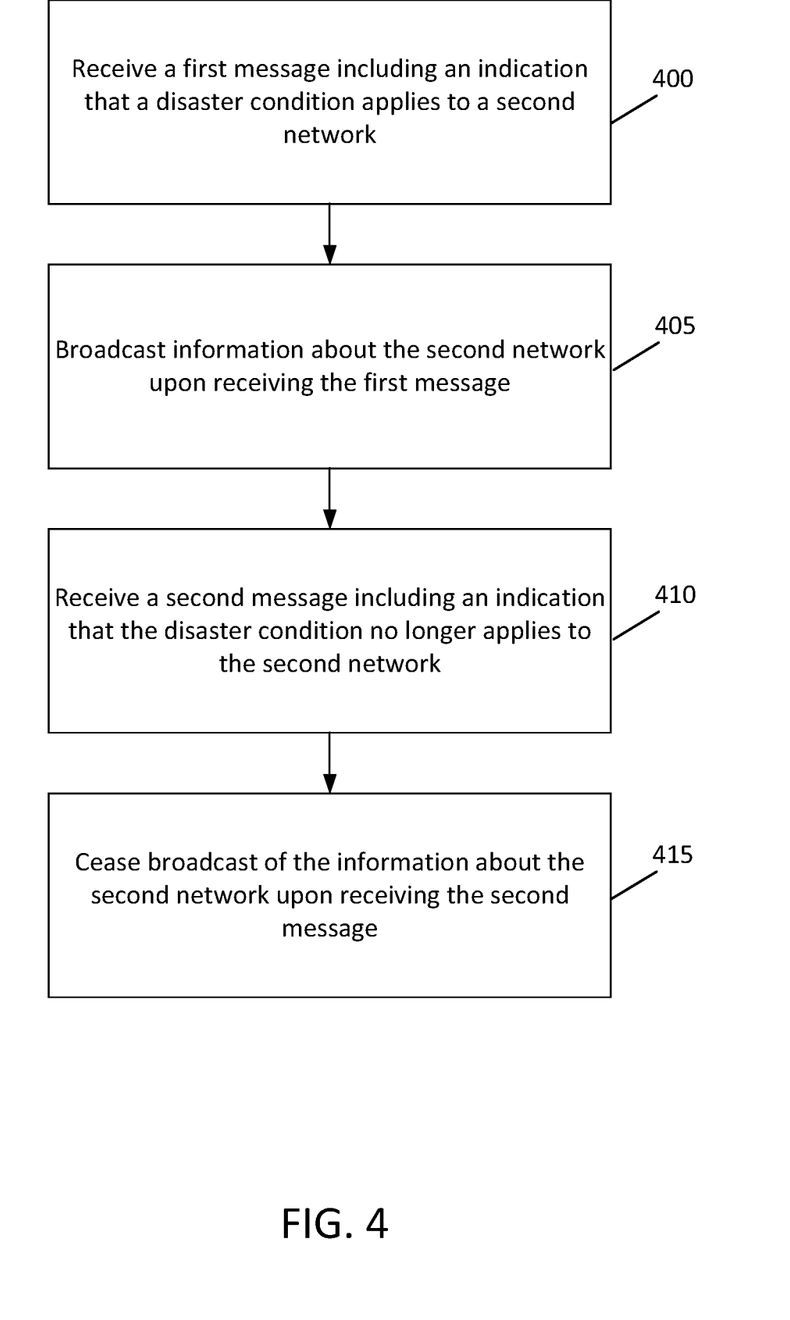
FIG. 4 illustrates an example flow diagram of a further method, according to certain example embodiments.

FIG. 4 illustrates an example flow diagram of a further method, according to certain example embodiments. In an example embodiment, the method of FIG. 4 may be performed by a network entity, network node, or a group of multiple network elements in a 3GPP system, such as LTE or 5G-NR. For instance, in an example embodiment, the method of FIG. 4 may be performed by a NG-RAN, 5GCN, AMF, or communication network, for instance similar to apparatus 20 illustrated in FIGS. 5(a) and 5(b).

According to certain example embodiments, the method of FIG. 4 may include, at 400, receiving a first message including an indication that a disaster condition applies to a second network. The method may also include, at 405, broadcasting information about the second network upon receiving the first message. The method may further include, at 410, receiving a second message including an indication that the disaster condition no longer applies to the second network. In addition, the method may include, at 415, ceasing broadcast of the information about the second network upon receiving the second message.

According to certain example embodiments, the information may be broadcast to user equipment. According to further example embodiments, the method may also include assisting the user equipment to register to the second network to which the disaster condition applies. According to other example embodiments, the information about the second network to which the disaster condition applies may include one or more tracking area identities containing an identity of the second network to which the disaster condition applies. In certain example embodiments, the method may further include initiating a setup procedure towards a first network, the setup procedure may include sending a setup request message to the first network, and the setup request message may include one or more tracking area identities of an identity of the second network to which the disaster condition applies.

Figure 5A:
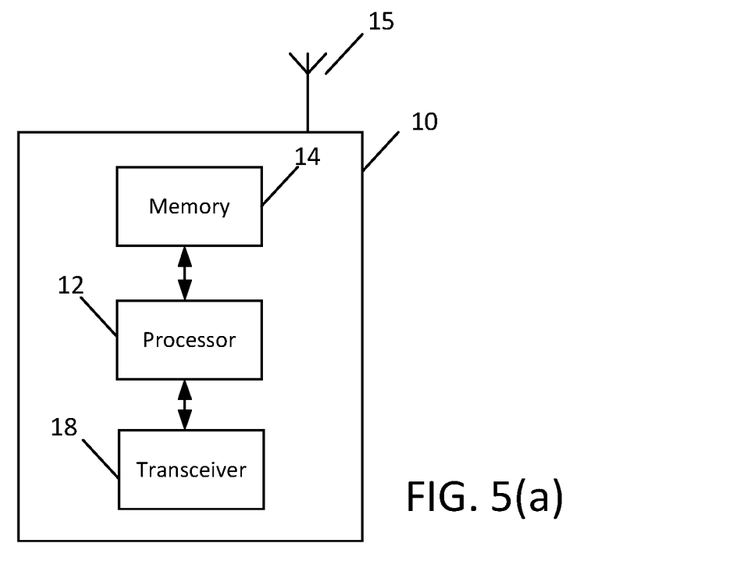
FIG. 5(a) illustrates an apparatus, according to certain example embodiments.

FIG. 5(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 5(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 5(a).

As illustrated in the example of FIG. 5(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1 and 2.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1 and 2.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive broadcast information containing a barring factor for an access identity. Apparatus 10 may also be controlled by memory 14 and processor 12 to perform an access barring check for an access attempt associated with the access identity using the broadcast information. According to certain example embodiments, within the access barring check, whether the access attempt associated with the access identity is considered as allowed or barred may be determined by comparing the barring factor for the access identity and a number drawn randomly.

Figure 5B:
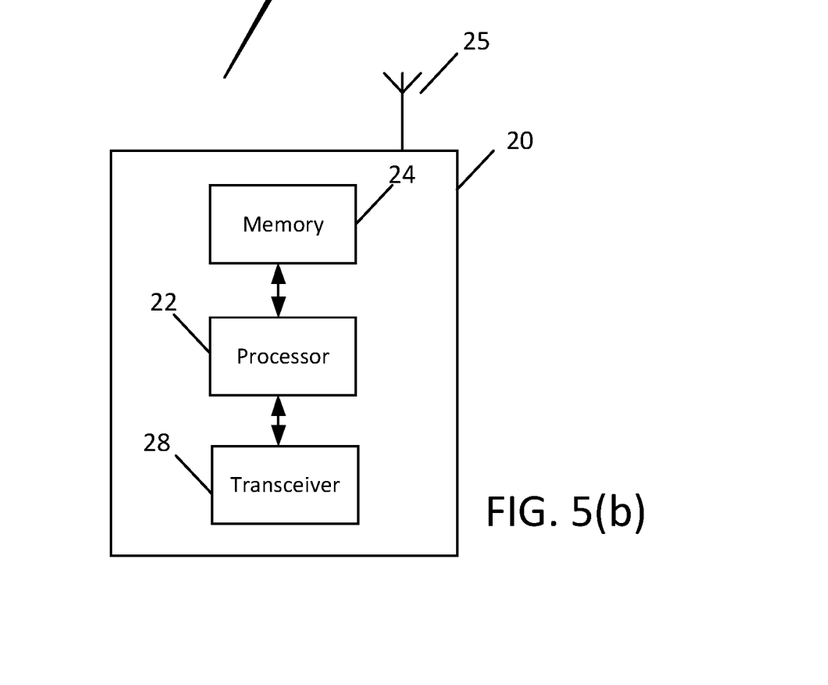
FIG. 5(b) illustrates another apparatus, according to certain example embodiments.

FIG. 5(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 5(b)

As illustrated in the example of FIG. 5(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1, 3, and 4.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1, 3, and 4.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in certain example embodiments, apparatus 20 may be controlled by memory 24 and processor 22 to send, to a network node of a first network, a first message including an indication that a disaster condition applies to a second network when the disaster condition applies to the second network. Apparatus 10 may also be controlled by memory 24 and processor 22 to send a second message to the network node of the first network including an indication that the disaster condition no longer applies to the second network when the disaster condition no longer applies to the second network.

In other example embodiments, apparatus 20 may be controlled by memory 24 and processor 22 to receive a first message including an indication that a disaster condition applies to a second network. Apparatus 20 may also be controlled by memory 24 and processor 22 to broadcast information about the second network upon receiving the first message. Apparatus 20 may further be controlled by memory 24 and processor 22 to receive a second message comprising an indication that the disaster condition no longer applies to the second network. In addition, apparatus 20 may be controlled by memory 24 and processor 22 to cease broadcast of the information about the second network upon receiving the second message.

Further example embodiments may provide means for performing any of the functions, steps, or procedures described herein. For example one example embodiment may be directed to an apparatus that includes means for receiving broadcast information containing a barring factor for an access identity. The apparatus may also include means for performing an access barring check for an access attempt associated with the access identity using the broadcast information. According to certain example embodiments, within the access barring check, whether the access attempt associated with the access identity is considered as allowed or barred may be determined by comparing the barring factor for the access identity and a number drawn randomly.

Other example embodiments may be directed to an apparatus that includes means for sending, to a network node of a first network, a first message including an indication that a disaster condition applies to a second network when the disaster condition applies to the second network. The apparatus may also include means for sending a second message to the network node of the first network including an indication that the disaster condition no longer applies to the second network when the disaster condition no longer applies to the second network.

Additional example embodiments may be directed to an apparatus that includes means for receiving a first message including an indication that a disaster condition applies to a second network. The apparatus may also include means for broadcasting information about the second network upon receiving the first message. The apparatus may further include means receiving a second message including an indication that the disaster condition no longer applies to the second network. In addition, the apparatus may include means for ceasing broadcast of the information about the second network upon receiving the second message.

Certain example embodiments described herein provide several technical improvements, enhancements, and/or advantages. In some example embodiments, systems and methods to steer terminals to a different network in case of a disaster are provided. As a result, it may be possible to minimize service interruption in case of disaster.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5$^{th}$ Generation
5 GCN 5G Core Network
AMF Access and Mobility Management Function
CN Core Network
CT CN and Terminals
DC Disaster Condition
eNB Enhanced Node B
gNB 5G or Next Generation NodeB
NG-RAN Next Generation RAN
NR New Radio
PLMN Public Land Mobile Network
RAN Radio Access Network
SA Service and System Aspects
TAI Tracking Area Identity
TR Technical Report
TS Technical Specification
TSG TS Group
UE User Equipment

I claim:

1. A method, comprising:
receiving a first message comprising an indication that a disaster condition applies to a second network;
broadcasting, upon receiving the first message, information about an identity of the second network and barring information for the second network, wherein the barring information contains information about an access identity, the access identity being an access identity configured in a user equipment for a disaster condition, and a barring factor for the access identity, wherein the information is broadcast to the user equipment, wherein the information about the identity of the second network is comprised in one or more tracking area identities;
assisting the user equipment to register to the second network to which the disaster condition is applied, wherein the information about the second network to which the disaster condition applies includes one or more tracking area identities containing an identity of the second network to which the disaster condition applies;
initiating a setup procedure towards a first network, the setup procedure includes sending a setup request message to the first network, and the setup request message includes one or more tracking area identities of an identity of the second network to which the disaster condition applies;
receiving a second message including an indication that the disaster condition no longer applies to the second network; and
ceasing broadcast of the information about the second network upon receiving the second message.

* * * * *